US011500635B2

(12) United States Patent
Jia et al.

(10) Patent No.: US 11,500,635 B2
(45) Date of Patent: Nov. 15, 2022

(54) HETEROGENEOUS MICROPROCESSOR FOR ENERGY-SCALABLE SENSOR INFERENCE USING GENETIC PROGRAMMING

(71) Applicant: The Trustees of Princeton University, Princeton, NJ (US)

(72) Inventors: Hongyang Jia, Princeton, NJ (US); Naveen Verma, Princeton, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 748 days.

(21) Appl. No.: 15/614,081

(22) Filed: Jun. 5, 2017

(65) Prior Publication Data

US 2018/0349142 A1    Dec. 6, 2018

(51) Int. Cl.
*G06F 9/30* (2018.01)
*G06F 16/28* (2019.01)
(Continued)

(52) U.S. Cl.
CPC ........ *G06F 9/30145* (2013.01); *G06F 9/3001* (2013.01); *G06F 9/30079* (2013.01);
(Continued)

(58) Field of Classification Search
CPC .. G06F 9/30145; G06F 16/285; G06F 9/3001; G06F 9/30079; G06F 9/30083; G06N 20/10; G06N 3/126
See application file for complete search history.

(56) References Cited

U.S. PATENT DOCUMENTS

| 2013/0080808 A1* | 3/2013 | Verma | G06F 1/3237 |
| | | | 713/322 |
| 2014/0344194 A1* | 11/2014 | Lee | G06N 20/00 |
| | | | 706/12 |
| 2018/0046913 A1* | 2/2018 | Yu | G06N 3/0454 |

OTHER PUBLICATIONS

Funie et al, Run-time Reconfigurable Acceleration for Genetic Programming Fitness Evaluation in Trading Strategies, May 8, 2017, J Signal process syst (Year: 2017).*

(Continued)

*Primary Examiner* — Casey R. Garner
(74) *Attorney, Agent, or Firm* — Meagher Emanuel Laks Goldberg & Liao, LLP

(57) ABSTRACT

A heterogeneous microprocessor configured to perform classification on an input signal. The heterogeneous microprocessor includes a die with a central processing unit (CPU) a programmable feature-extraction accelerator (FEA) and a classifier. The FEA is configured to perform feature extraction on the input signal to generate feature data. The classifier is configured to perform classification on the feature data and the CPU is configured to provide processing after classification. The FEA may be configured with a plurality of Gene-Computation (GC) Cores. The FEA may be configured for genetic programing with gene depth constraints, gene number constraints and base function constraints. The classifier may be a support-vector machine accelerator (SVMA). The SVMA may include training data based on error-affected feature data. The heterogeneous microprocessor may also include an automatic-programming & classifier training module. An automatic-programming & classifier training module may be configured to receive input-output feature data and training labels and generate gene code and a classifier model.

16 Claims, 20 Drawing Sheets

(51) Int. Cl.
*G06N 20/10* (2019.01)
*G06N 3/12* (2006.01)

(52) U.S. Cl.
CPC ........ *G06F 9/30083* (2013.01); *G06F 16/285* (2019.01); *G06N 3/126* (2013.01); *G06N 20/10* (2019.01)

(56) References Cited

OTHER PUBLICATIONS

Jia, Hongyang, Jie Lu, Niraj K. Jha, and Naveen Verma. "A heterogeneous microprocessor for energy-scalable sensor inference using genetic programming." In 2017 Symposium on VLSI Circuits, pp. C28-C29. IEEE, Jun. 5, 2017. (Year: 2017).*
Vasicek, Zdenek, and Lukas Sekanina. "An evolvable hardware system in Xilinx Virtex II Pro FPGA." International Journal of Innovative Computing and Applications 1, No. 1 (2007): 63-73. (Year: 2007).*
Q. Zhang, T. Wang, Y. Tian, F. Yuan, and Q. Xu, "ApproxANN: An approximate computing framework for artificial neural network," in Proc. Design, Automat. Test in Europe Conf., Mar. 2015, pp. 701-796.
H. Esmaeilzadeh, E. Blem, R. Amant, K. Sankaralingam, and D. Burger, "Dark silicon and the end of multicore scaling," in Proc. Symp. Comput. Architect., Jun. 2011, pp. 365-376.
V. Chippa, D. Mohapatra, K. Roy, S. Chakradhar, and A. Raghunathan, "Scalable effort hardware design," IEEE Trans. VLSI Syst., vol. 22, No. 9, pp. 2004-2016, Sep. 2014.
S. Chakradhar and A. Raghunathan, "Best-effort computing: Rethinking parallel software and hardware," in Proc. Design Automat. Conf., Jun. 2010, pp. 865-870.
C. Alvarez, J. Corbal, and M. Valero, "Fuzzy memoization for floating-point multimedia applications," IEEE Trans. Comput., vol. 54, No. 7, pp. 922-927, Jul. 2005.
N. Verma, K. H. Lee, K. J. Jang, and A. Shoeb, "Enabling systemlevel platform resilience through embedded data-driven inference capabilities in electronic devices," in Proc. IEEE Int. Conf. Acoust., Speech and Signal Process., Mar. 2012, pp. 5285-5288.
Z. Wang, R. Schapire, and N. Verma, "Error adaptive classifier boosting (EACB): Leveraging data-driven training towards hardware resilience for signal inference," IEEE Trans. Circuits Syst. I, vol. 62, No. 4, pp. 1136-1145, Apr. 2015.
H. Guo, L. Jack, and A. Nandi, "Feature generation using genetic programming with application to fault classification," IEEE Trans. Syst., Man, and Cybern., vol. 35, No. 1, pp. 89-99, Feb. 2005.
J. Kishore, L. Patnaik, V. Mani, and V. Agrawal, "Application of genetic programming for multicategory pattern classification," IEEE Trans. Evol. Comput., vol. 4, No. 3, pp. 242-258, Sep. 2000.
K. H. Lee and N. Verma, "A low-power processor with configurable embedded machine-learning accelerators for high-order and adaptive analysis of medical-sensor signals," IEEE J. Solid-State Circuits, vol. 48, No. 7, pp. 1625-1637, Jul. 2013.
S. Mittal, "A survey of techniques for approximate computing," ACM Comput. Surveys, vol. 48, No. 4, pp. 62:1-62:33, Mar. 2016.
A. Kahng and S. Kang, "Accuracy-configurable adder for approximate arithmetic designs," in Proc. Design Automat. Conf. Jun. 2012.
J. Miguel, M. Badr, and N. Jerger, "Load value approximation," in Proc. IEEE/ACM Int. Symp. Microarchitecture, Dec. 2013, pp. 127-139.
S. Bandyopadhyay and U. Maulik, "Genetic clustering for automatic evolution of clusters and application to image classification," Pattern Recognition, vol. 35, No. 6, pp. 1197-1208, Jun. 2002.
P. A. Estevez, N. Becerra-Yoma, N. Boric, and J. A. Ramirez, "Genetic programming-based voice activity detection," Electronics Letters, vol. 41, No. 20, pp. 1141-1143, Sep. 2005.

Z. Wang, K. H. Lee, and N. Verma, "Overcoming computational errors in sensing platforms through embedded machine-learning kernels," IEEE Trans. VLSI Syst., vol. 23, No. 8, pp. 1459-1470, Aug. 2015.
T. von Sydow, B. Neumann, H. Blume, and T. G. Noll, "Quantitative analysis of embedded FPGA-architectures for arithmetic," in Proc. 17th Int. Conf. Application-specific Syst., Architect. and Processors, Sep. 2006, pp. 125-131.
A. Lingamneni, C. Enz, K. Palem, and C. Piguet, "Highly energyefficient and quality-tunable inexact FFT accelerators," in Proc. IEEE Custom Integrated Circuits Conf., Sep. 2014, pp. 1-4.
T. Chen, Z. Du, N. Sun, J. Wang, C. Wu, Y. Chen, and O. Temam, "DianNao: A small-footprint high-throughput accelerator for ubiquitous machine-learning," SIGARCH Comput. Archit. News, vol. 42, No. 1, pp. 269-284, Feb. 2014.
J. Struharik, "Implementing decision trees in hardware," in Proc. IEEE Int. Symp. Intell. Syst. and Inform., Sep. 2011, pp. 41-46.
Z. Xie, T. Quirino, M. L. Shyu, and S. C. Chen, "ASIC: Supervised multi-class classification using adaptive selection of information components," in Proc. Int. Conf. Semantic Comput., Sep. 2007, pp. 527-534.
S. Li and Q. M. Yi, "The design of high-speed and low power consumption bidirection Viterbi decoder," in Proc. Int. Machine Learning and Cybern. Conf., Aug. 2006, pp. 3886-3890.
J. R. Sherrah, R. E. Bogner, and A. Bouzerdoum, "The evolutionary pre-processor: Automatic feature extraction for supervised classification using genetic programming," in Proc. 2nd Int. Conf. Genetic Programming, Jul. 1997, pp. 304-312.
M. Kotani, S. Ozawa, M. Nakai, and K. Akazawa, "Emergence of feature extraction function using genetic programming," in Proc. 3rd Int. Conf. Knowl.-based Intell. Inf. Eng. Syst., Dec. 1999, pp. 149-152.
D. Y. Harvey and M. D. Todd, "Automated feature design for numeric sequence classification by genetic programming," IEEE Trans. Evol. Comput., vol. 19, No. 4, pp. 474-489, Aug. 2015.
U. Bhowan, M. Johnston, M. J. Zhang, and X. Yao, "Evolving diverse ensembles using genetic programming for classification with unbalanced data," IEEE Trans. Evol. Comput., vol. 17, No. 3, pp. 368-386, Jun. 2013.
K. Nag and N. Pal, "A multiobjective genetic programming-based ensemble for simultaneous feature selection and classification," IEEE Trans. Cybern., vol. 46, No. 2, pp. 499-510, Feb. 2016.
D. E. Moriarty and R. Miikkulainen, "Forming neural networks through efficient and adaptive coevolution," Evol. Comput., vol. 5, No. 4, pp. 373-399, Winter 1997.
K. O. Stanley and R. Miikkulainen, "Efficient reinforcement learning through evolving neural network topologies," in Proc. Genetic Evol. Comput. Conf., Jul. 2002, pp. 569-577.
N. Garcia-Pedrajas, C. Hervás-Martinez, and J. Muñoz-Pérez, "COVNET: A cooperative coevolutionary model for evolving artificial neural networks," IEEE Trans. Neural Netw., vol. 14, No. 3, pp. 575-596, May 2003.
K. H. Lee and N. Verma, "A low-power microprocessor for datadriven analysis of analytically-intractable physiological signals in advanced medical sensors," in Proc. Symp. VLSI Circuits, Jun. 2013, pp. C250-C251.
IAR Systems, "MSP430 IAR Embedded Workbench® IDE project management and building guide," IAR Systems AB, Uppsala, Uppsala County, Sweden, Tech. Rep., Nov. 2015.
K. Venkat, "Efficient multiplication and division using MSP30," Texas Instruments Incorporated, Dallas, Texas, USA, Tech. Rep., Sep. 2006.
Texas Instruments, "IAR Embedded WorkbenchTM version 3+ for MSP430TM," Texas Instruments Incorporated, Dallas, Texas, USA, Tech. Rep., Jun. 2016.
A. L. Goldberger, L. A. Amaral, L. Glass, J. M. Hausdorff, P. C. Ivanov, R. G. Mark, J. E. Mietus, G. B. Moody, C. K. Peng, and H. E. Stanley, "Physiobank, Physiotoolkit, and Physionet components of a new research resource for complex physiologic signals," Circulation, vol. 101, No. 23, pp. e215-e220, Jun. 2000.
M. Srinivas and M. Patnaik, "Adaptive probabilities of crossover and mutation in genetic algorithms," IEEE Trans. Sys., Man and Cyb., vol. 24, No. 4, pp. 656-667, Apr. 1994.

(56) References Cited

OTHER PUBLICATIONS

A. Parkins and A. K. Nandi, "Genetic programming techniques for hand written digit recognition," Signal Process., vol. 84, No. 12, pp. 2345-2365, Jul. 2004.
G. Moody and R. Mark, "The impact of the MIT-BIH arrhythmia database," IEEE Eng. Med. Biol., vol. 20, No. 3, pp. 45-50, Jun. 2001.
R. Martis, M. Krishnan, C. Chakraborty, S. Pal, D. Sarkar, K. Mandana, and A. Ray, "Automated screening of arrhythmia using wavelet based machine learning techniques," J. Med. Syst., vol. 36, No. 2, pp. 677-688, Apr. 2012.
Lee et al. "A Low-Power Processor With Configurable Embedded Machine-Learning Accelerators for High-Order and Adaptive Analysis of Medical-Sensor Signals", IEEE Journal of Solid-State Circuits, vol. 48, No. 7, pp. 1625-1637, Jul. 2013.
Wang et al. "Overcoming Computational Errors in Sensing Platforms Through Embedded Machine-Learning Kernels", IEEE TVLSI, pp. 1459-1470, Aug. 2015.
Shoeb, Guttag, "Application of Machine Learning To Epileptic Seizure Detection", ICML, Jun. 2010.
Ubeyli "ECG beats classification using multiclass support vector machines with error correcting output codes", Digit. Signal Processing, pp. 675-684, May 2007.

\* cited by examiner

[M. Horowitz, ISSCC'14]

Typical energy breakdown:

Programmability overhead
(instruction/operand fetch/decode)  Compute

| SUMMARY TABLE | |
|---|---|
| Technology | GF 130nm CMOS |
| Supply Voltage | 0.75 – 1.2V |
| Clock Frequency | 5.0 – 29MHz |
| Energy/Clock (0.75V): | |
| (1) CPU | 21.8pJ |
| (2) FEA | 86.7pJ |
| (3) SVMA | 68.3pJ |
| Energy per F.V. (1.2V)²: | FEA/SVMA |
| (1) Seizure Detect–GP Model 1 | 3.38µJ / 18.3µJ |
| (2) Seizure Detect–GP Model 2 | 1.01µJ / 31.6µJ |
| (3) Arrhyth. Detect– GP Model 1 | 0.35µJ / 0.18µJ |
| (4) Arrhyth. Detect– GP Model 2 | 0.045µJ / 0.18µJ |

²Energy of all other blocks < 40 nJ/F.V.

Figure 8F

| COMPARISON TABLE WITH STATE-OF-ART ACCELERATORS | | | | | |
|---|---|---|---|---|---|
| | FIXED FUNCTION | | PROGRAMMABLE | | |
| | Moons<br>VLSI Symp. 2016 | Kim<br>ISSCC 2009 | GPGPU<br>Nvidia P100 | Bohnenstiehl<br>VLSI Symp. 2016 | This Work |
| Technology | 40nm | 130nm | 16nm | 32nm | 130nm |
| Quantization Strategy | 1 - 16 bit fixed | 16 bit fixed | Mixed | 16 bit fixed | 32 bit fixed |
| Function | CNN | Obj. Recog. | Prog. | Prog. | Prog. |
| Energy Scale Strategy | Bit precision | ~ | ~ | ~ | GP model approx. |
| Energy Scale Range | 8.7x | ~ | ~ | ~ | 9 ~ 20x |
| Energy Efficiency | 0.3 - 2.6 TOPS/W | 290 GOPS/W | ~ 10 GFLOPS/W | 172 GOPS/W | 221 GOPS/W$^a$ |

$^a$1 OP equals 1 ADD/MULT

Figure 8G

HETEROGENEOUS MICROPROCESSOR FOR ENERGY-SCALABLE SENSOR INFERENCE USING GENETIC PROGRAMMING

STATEMENT REGARDING FEDERALLY SPONSORED RESEARCH OR DEVELOPMENT

This invention was made with government support under Grant CCF-1253670 awarded by the National Science Foundation and Grant FA9550-14-1-0293 awarded by the US Air Force Office of Scientific Research and Grant No. HR0011-13-3-0002 awarded by the Department of Defense/Defense Advanced Research Projects Agency (DARPA). The government has certain rights in the invention.

FIELD OF THE INVENTION

The present disclosure generally relates to the field of embedded computing systems and in more particular embedded computing systems with a heterogenous architecture to provide both computational flexibility and power efficiency.

BACKGROUND

An embedded computing system is generally a computer system with a dedicated function within a larger mechanical or electrical system. Such systems are often with associated sensors and have real-time computing constraints as well as energy constraints. Many embedded systems are based on microcontrollers (i.e. CPU's with integrated memory or peripheral interfaces), but ordinary microprocessors (using external chips for memory and peripheral interface circuits) may be used. A common class of dedicated processors is the digital signal processor (DSP). Such processors allow for a wide variety of computations but this flexibility tends to consume excess power. Hardware specialization may be used to address power constrains This limits embedded computing systems to a fixed set of computations but increases power efficiency. What is needed is an embedded computing system that provides both computational flexibility and power efficiency.

SUMMARY OF THE INVENTION

A heterogeneous microprocessor configured to perform classification on an input signal is disclosed. The heterogeneous microprocessor includes a die with a central processing unit (CPU) a programmable feature-extraction accelerator (FEA) and a classifier. The FEA is configured to perform feature extraction on the input signal to generate feature data. The classifier is configured to perform classification on the feature data and the CPU is configured to provide processing after classification. The FEA may be configured with a plurality of Gene-Computation (GC) Cores. The FEA may include a genetic programing (GP) model manager (GPMM) for linear combination of outputs obtained from the GC cores. Each of the GC cores may include a controller, a gene-code memory and a single-instruction execution pipeline with an arithmetic logic unit (ALU) and a stack scratchpad. The pipeline may be is optimized to implement tree-structured genes.

The FEA may be configured for genetic programing with gene depth constraints, gene number constraints and base function constraints. The heterogeneous microprocessor may also include a Power Management Unit for controlling fine-grained clock gating. The classifier may be a support-vector machine accelerator (SVMA). The SVMA may include training data based on error-affected feature data. The heterogeneous microprocessor may also include an automatic-programming & classifier training module. The automatic-programming & classifier training module may be configured to receive input-output feature data and training labels and generate gene code and a classifier model.

A method of performing classification on an input signal with a heterogeneous microprocessor is disclosed. The method includes providing a die with a central processing unit (CPU) a programmable feature-extraction accelerator (FEA) and a classifier. The FEA is configured to perform feature extraction on the input signal to generate feature data. The classifier is configured to perform classification on the feature data and the CPU is configured to provide processing after classification. The FEA may be configured with a plurality of Gene-Computation (GC) Cores. The FEA may include a genetic programing (GP) model manager (GPMM) for linear combination of outputs obtained from the GC cores. Each of the GC cores may include a controller, a gene-code memory and a single-instruction execution pipeline with an arithmetic logic unit (ALU) and a stack scratchpad. The pipeline may be is optimized to implement tree-structured genes.

The FEA may be configured for genetic programing with gene depth constraints, gene number constraints and base function constraints. The heterogeneous microprocessor may also include a Power Management Unit for controlling fine-grained clock gating. The classifier may be a support-vector machine accelerator (SVMA). The SVMA may include training data based on error-affected feature data. The heterogeneous microprocessor may also include an automatic-programming & classifier training module. The automatic-programming & classifier training module may be configured to receive input-output feature data and training labels and generate gene code and a classifier model.

BRIEF DESCRIPTION OF THE FIGURES

FIG. 8F is a summary table showing the block breakdown for energy/clock and energy; and FIG. 8G is a comparison table showing the FEA energy scalability and efficiency.

To facilitate understanding, identical reference numerals have been used, where possible, to designate identical elements that are common to the figures.

DETAILED DESCRIPTION

Figure 1A:
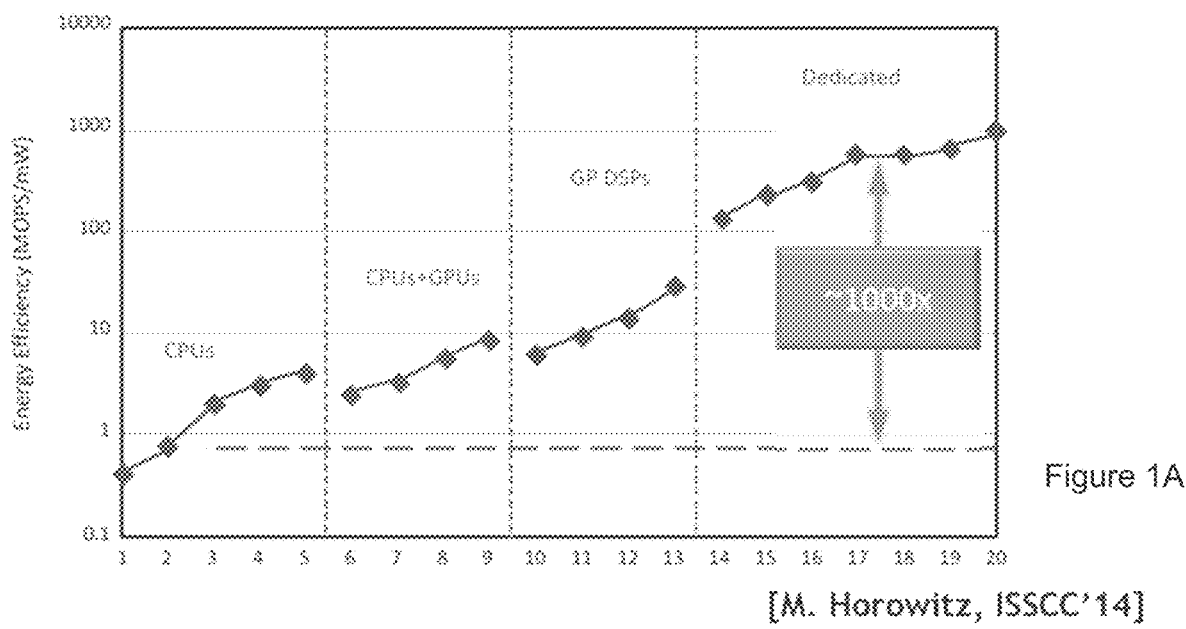
FIG. 1A is a graph showing the energy efficiency for different classes of computing devices.
Figure 1B:
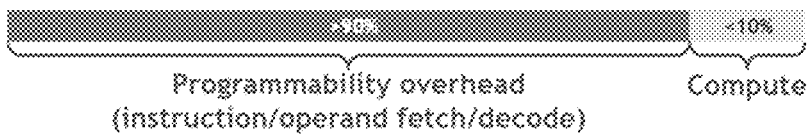
FIG. 1B is a graph showing the typical energy breakdown for conventional computing systems.

This disclosure is focused on a heterogeneous microprocessor for sensor-inference applications, which achieves programmability required for feature extraction strictly using application data. Existing systems suffer from a variety of problems. FIG. 1A is a chart showing the energy efficiency for different classes of computing devices. It is apparent that energy efficiency improves as systems move from typical CPUs to CPUs+GPUs to general purpose DSPs to dedicated hardware. Roughly a 1000× improvement in efficiency or energy per operation is realized when moving from CPUs to dedicated hardware. FIG. 1B is a graph showing the typical energy breakdown for conventional computing systems. More than 90% of the total energy used by a conventional computing system is consumed due to programmability overhead (instruction/operand fetch and decode) and less than 10% of the total energy is actually consumed by actual computation. Acceleration improves energy efficiency but many systems also need programmability, to address the range of different computations in applications. Thus, there is great interest in programmable acceleration and balancing programmability needs with specialization for energy efficiency.

Figure 1C:
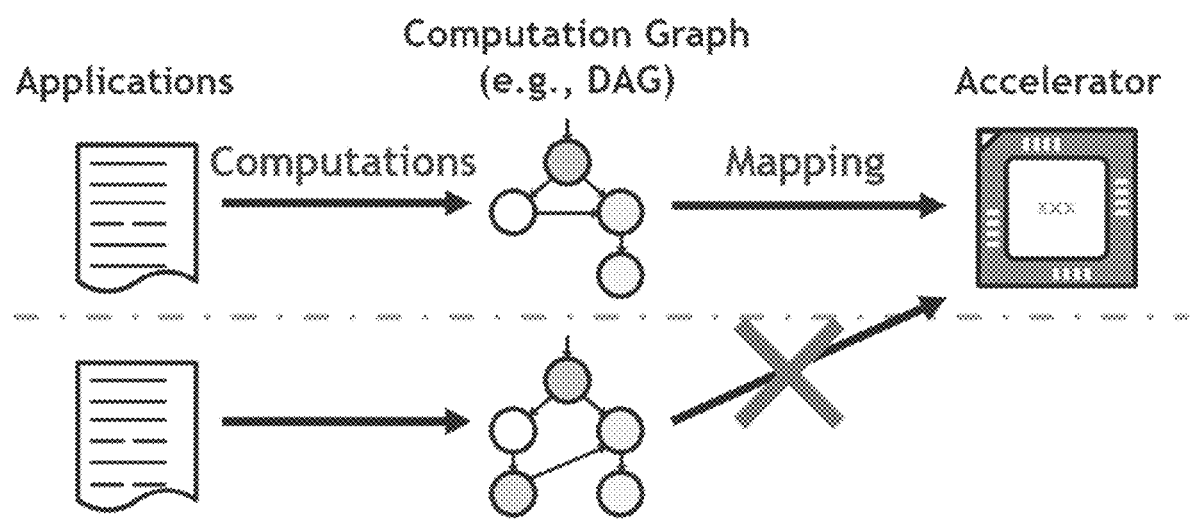
FIG. 1C is a block diagram showing the challenges relating to the use of accelerators such as the challenges associated with programmability.

FIG. 1C is a block diagram showing the challenges relating to the use of accelerators such as the challenges associated with programmability. A slight change in computation prevents the use of a hardware accelerator. Mapping computations to an accelerator is often difficult. So acceleration, though key for energy efficiency, poses substantial programmability challenges.

Figure 1D:
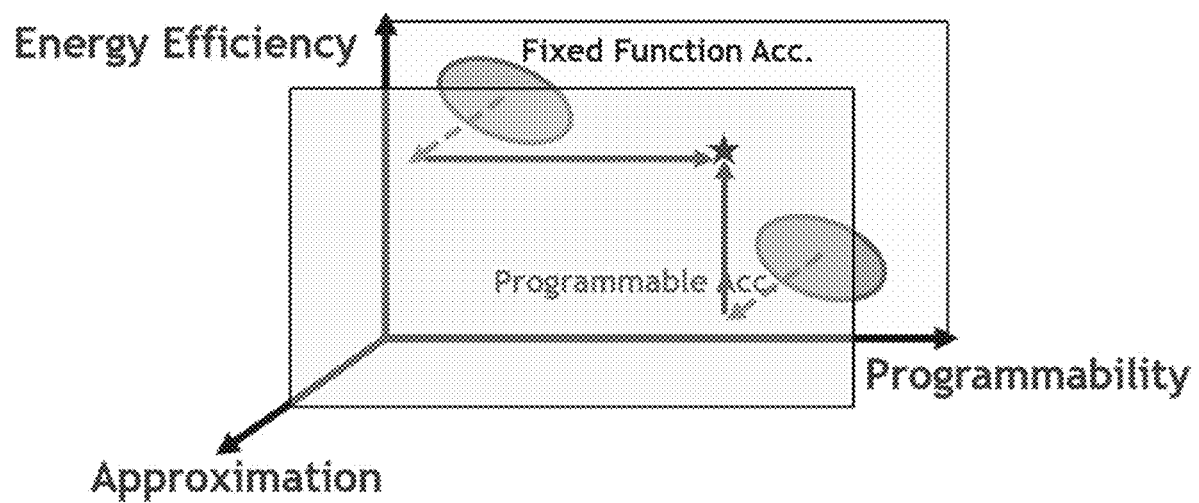
FIG. 1D is a pictorial diagram showing how approximating computations via specific, structured operations enables specialization.

FIG. 1D is a pictorial diagram showing how approximating computations via specific, structured operations enables specialization and overcomes many of the problems outlined above. As disclosed herein, genetic programming (GP) may be used for automatic program synthesis. It should be understood that a feature extraction accelerator may be implemented in a variety of configurations without departing from the scope of this disclosure. GP yields highly structured models of computation, enabling: (1) high degree of specialization; (2) systematic mapping of programs to the accelerator; and (3) energy scalability via user-controllable approximation. In one example, the microprocessor (130 nm) achieves 325×/156× energy reduction, and further 20×/9× energy scalability, for programmable feature extraction in two medical-sensor applications (seizure/arrhythmia-detection) vs. GP-model execution on CPU. The energy efficiency is 220 GOPS/W, near that of fixed-function accelerators, exceeding typical programmable accelerators.

Figure 2A:
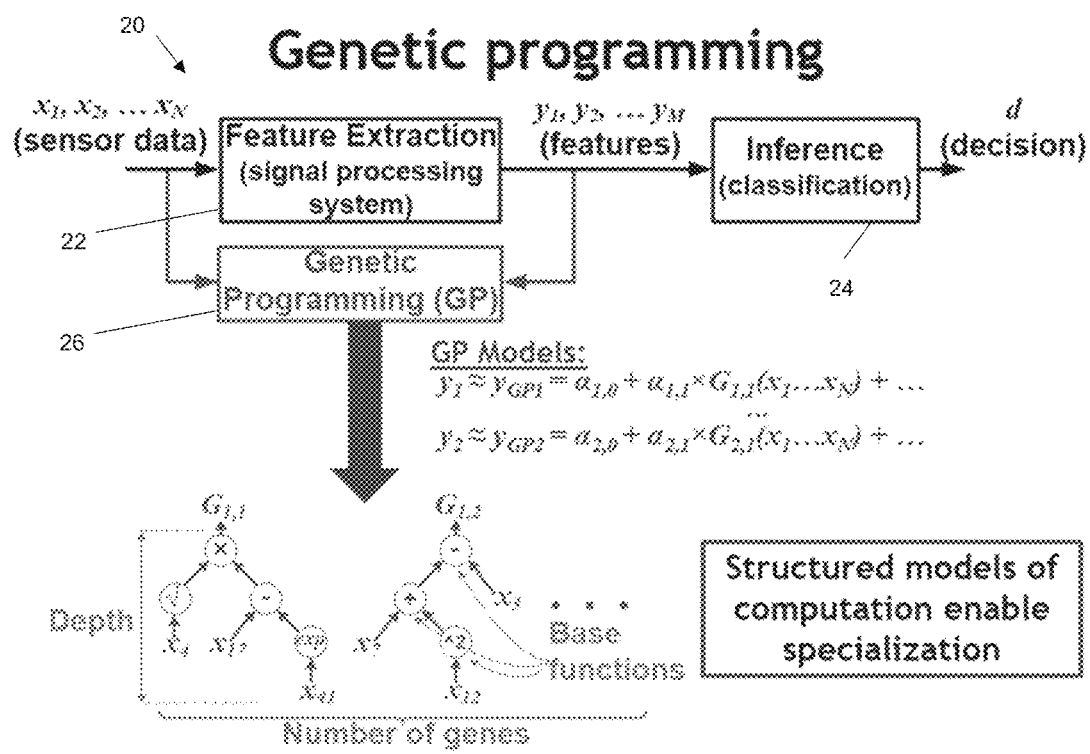
FIG. 2A is a diagram showing a generic sensor-inference system, including feature-extraction and classification stages.
Figure 2B:
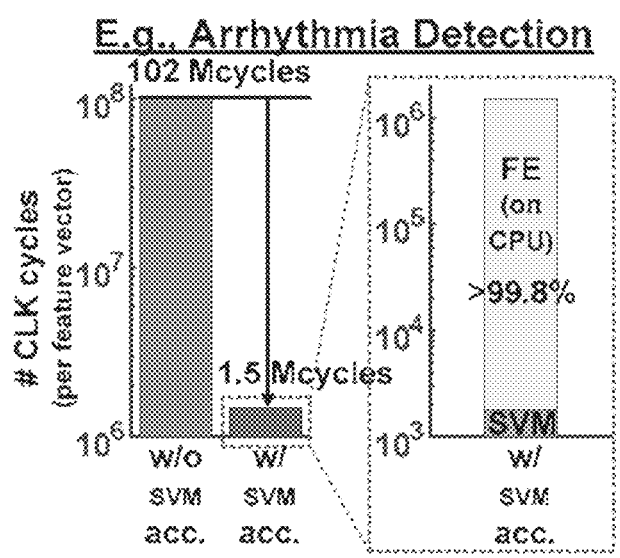
FIG. 2B is a graph showing the energy breakdown for an ECG-based arrhythmia detector.

FIG. 2A shows a generic sensor-inference system 20, including a feature-extraction stage 22 and a classification stage 24. Classification requires specific computational kernels from machine learning support-vector machines (SVM), neural networks, decision trees], and is readily delegated to energy-efficient accelerators. This typically leaves feature-extraction energy to dominate, as shown in FIG. 2B for an ECG-based arrhythmia detector. The challenge is that feature extraction varies greatly across applications and signals. Though acceleration is one of the most significant ways to enhance energy efficiency, its major problem is programmability, on several levels: (1) reducing specialization degrades energy efficiency; (2) mapping programs to harness specialization is extremely difficult without intimate knowledge of the accelerator microarchitecture; (3) only weak knobs are typically available for energy scalability, especially exploiting approximate computing, which shows significant promise in inference applications.

While GP has previously been employed for automatic program synthesis from high-level specifications (i.e., input-output data), here it is exploited to enable a heterogeneous architecture overcoming these challenges. FIG. 2A shows the key attributes of GP made use of. GP takes inputs $x_1 \ldots x_n$ and outputs $y_1 \ldots y_m$ (features in the inference system), to construct models of computation. These are referred to as GP models, by which approximations $y_{gp,1}, \ldots y_{gp,m}$ of the outputs can be derived from the inputs. Importantly, GP models have the specific structure shown, where units called genes $G_{i,j}$, corresponding to a tree of computation applied to inputs, are linearly combined. This structure has enabled learning rules and model generalization so that GP can apply to a broad range of computations. Here, this structure is exploited towards both a high degree of accelerator specialization and systematic mapping of computations to the accelerator. Further, GP proceeds by optimizing a fitness function between $y_i$ and $y_{G,P,i}$, under user-provided constraints to gene depth, number, and base functions (FIG. 2A), which all strongly impact energy. Thus, the fitness function provides a formal metric by which users can control an approximation-vs.-energy tradeoff. Here, this tradeoff is enhanced via classifier training, as described later.

Heterogeneous Microprocessor Design

Figure 3A:
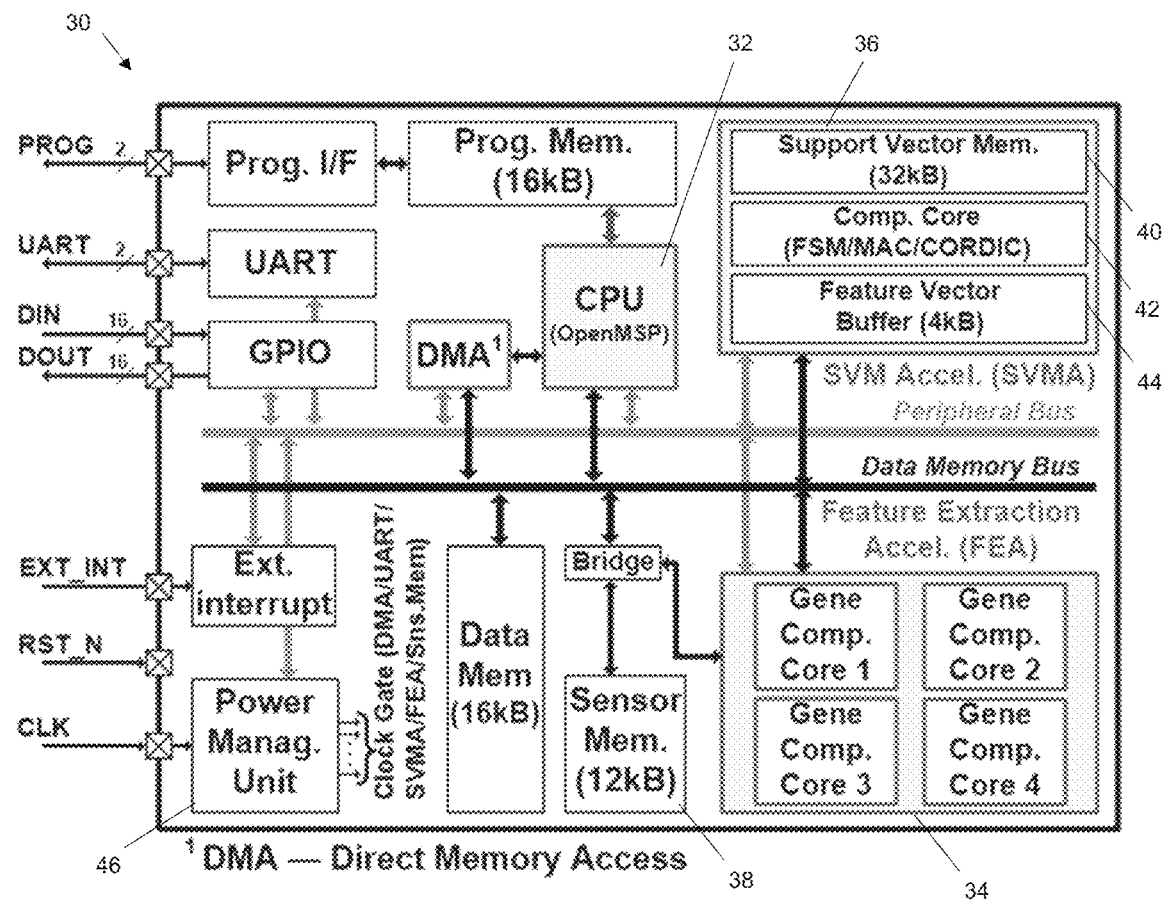
FIG. 3A is a block diagram of a heterogeneous microprocessor architecture.
Figure 3B:
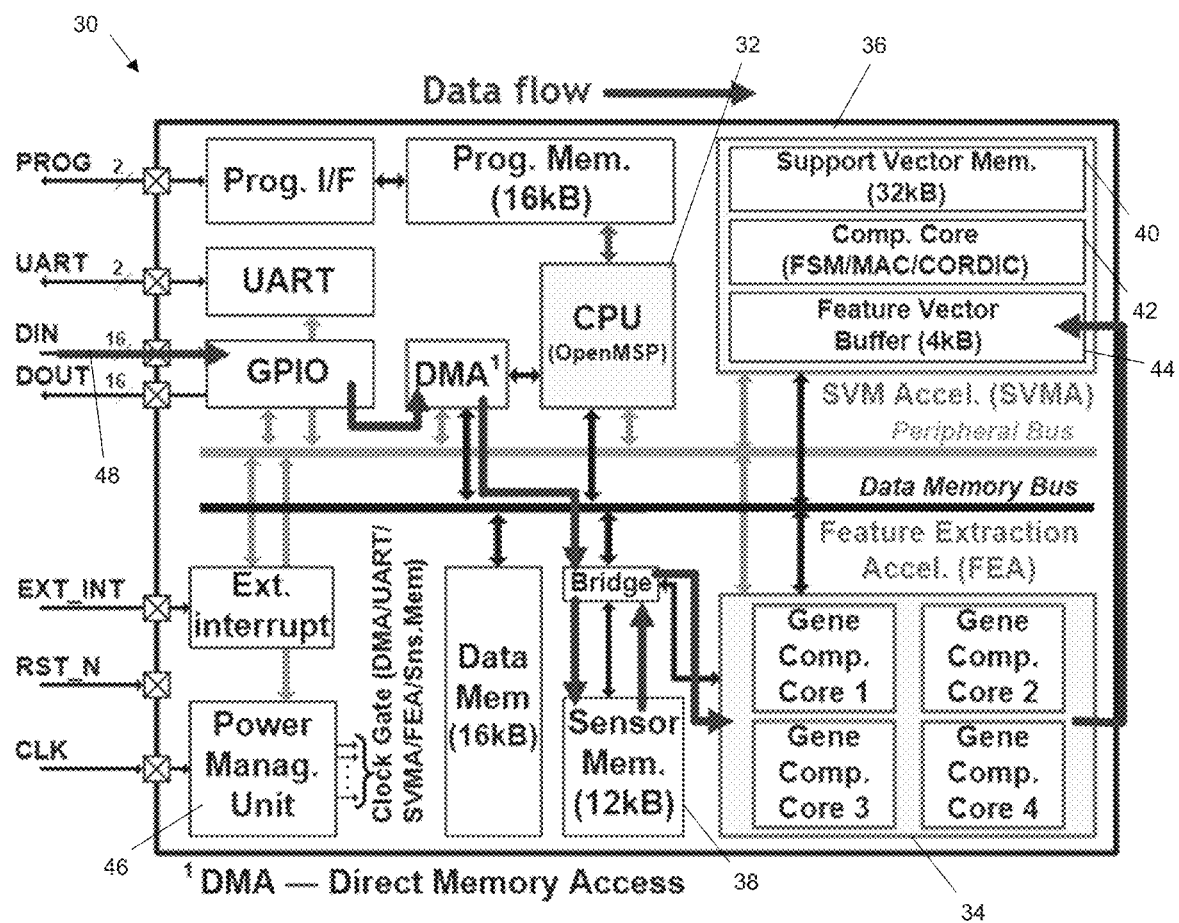
FIG. 3B is a block diagram the heterogeneous microprocessor architecture with the data flow for sensor inference included.
Figure 3C:
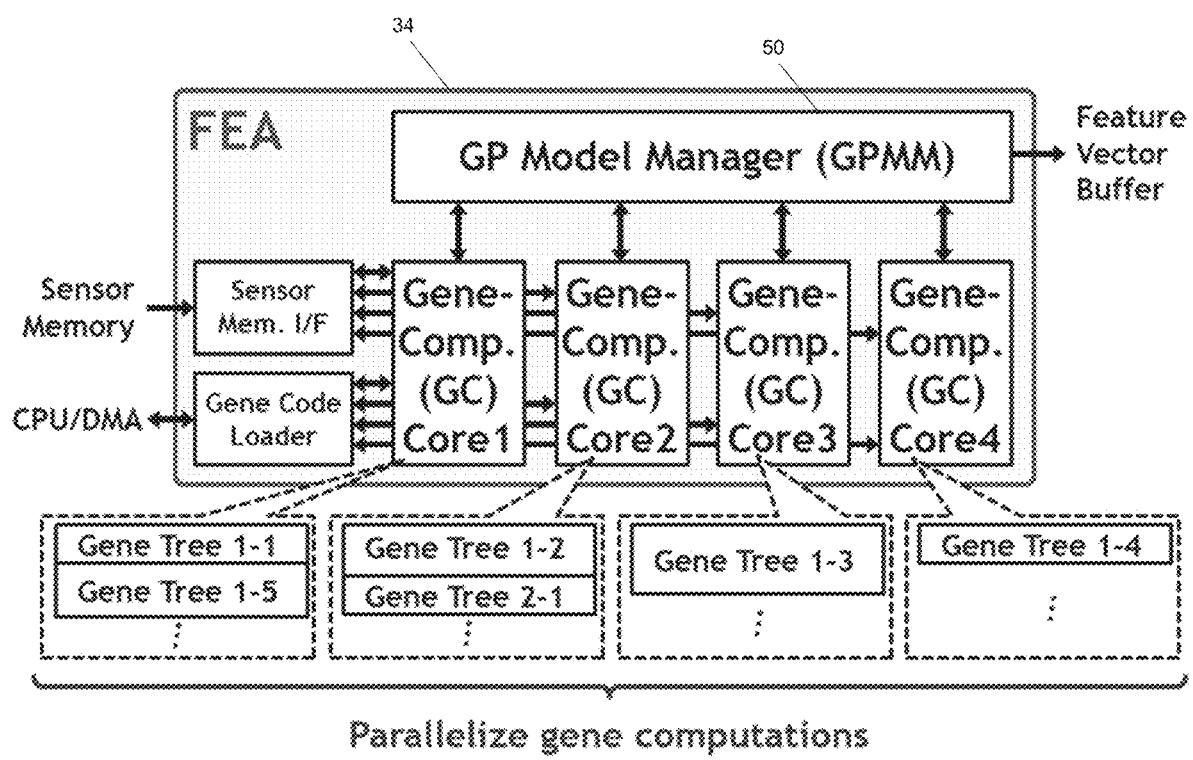
FIG. 3C is a more detailed block diagram the Feature-Extraction Accelerator.

FIG. 3A is a block diagram of a heterogeneous microprocessor architecture 30. FIG. 3B is a block diagram the heterogeneous microprocessor architecture 30 with the data flow for sensor inference included. A CPU (OpenMSP) 32 is integrated with a programmable Feature-Extraction Accelerator (FEA) 34 [including 4 Gene-Computation (GC) Cores] and an SVM Accelerator (SVMA) 36. Under DMA control, input data 48 is loaded to a Sensor Memory 38, and accessed by the FEA 34 as requested by GC cores. FIG. 3C is a more detailed block diagram the Feature-Extraction Accelerator. GC core outputs feed to a GP Model Manager (GPMM) 50 for linear combination, giving features then loaded in an SVM Feature-Vector Buffer 44. The SVMA performs classification, using support vectors loaded in local memory, and is configurable to various kernels (RBF, poly, linear), vector dimensionalities, and support-vector-set sizes. CPU intervention occurs after interrupt assertion following classification. A Power Management Unit 46 controls fine-grained clock gating, as data moves through the blocks.

Figures 4A, 4B:
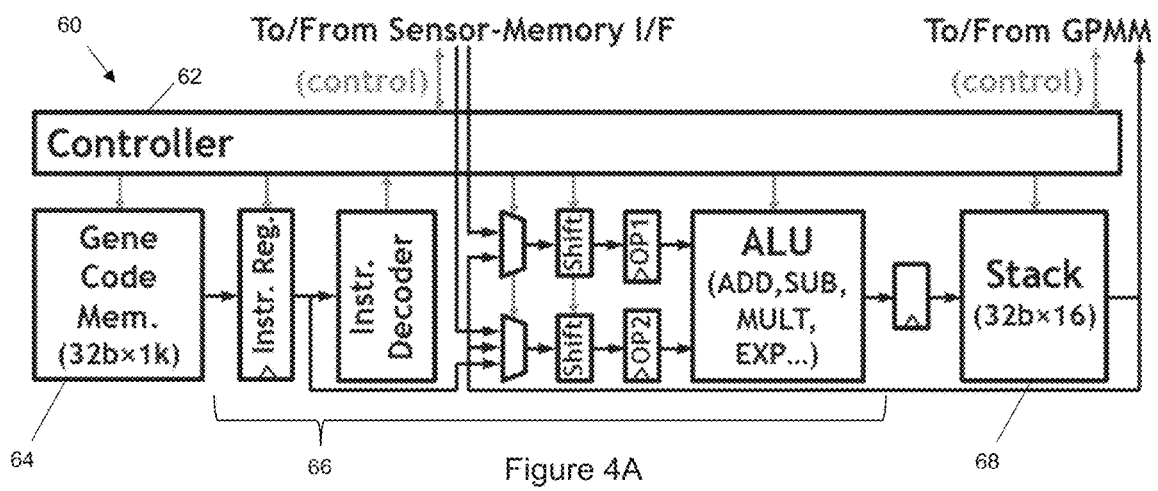
FIG. 4A is a block diagram showing the GC Core microarchitecture.
FIG. 4B is a table showing the types of operations supported by the arithmetic unit.

FIG. 4A is a block diagram showing the GC Core microarchitecture 60 including a controller 62, Gene-Code Memory 64, single-instruction execution pipeline 66. The GC Core microarchitecture 60 includes an arithmetic unit for ADD, SUB, MULT, SQUARE, CORDIC (exp, ln, square-root, reciprocal) operations and stack scratchpad 68. FIG. 4B is a table showing the supported types of operations. The pipeline is optimized to implement tree-structured genes. The 32$b$ gene-code instructions, having types shown, roughly map to a gene-tree node (or a control operation). Supported gene base functions are set by the arithmetic unit, with dynamic-range control enabled by preceding, instruction-configurable barrel shifters.

Classifier Training for Approximation

Figure 5A:
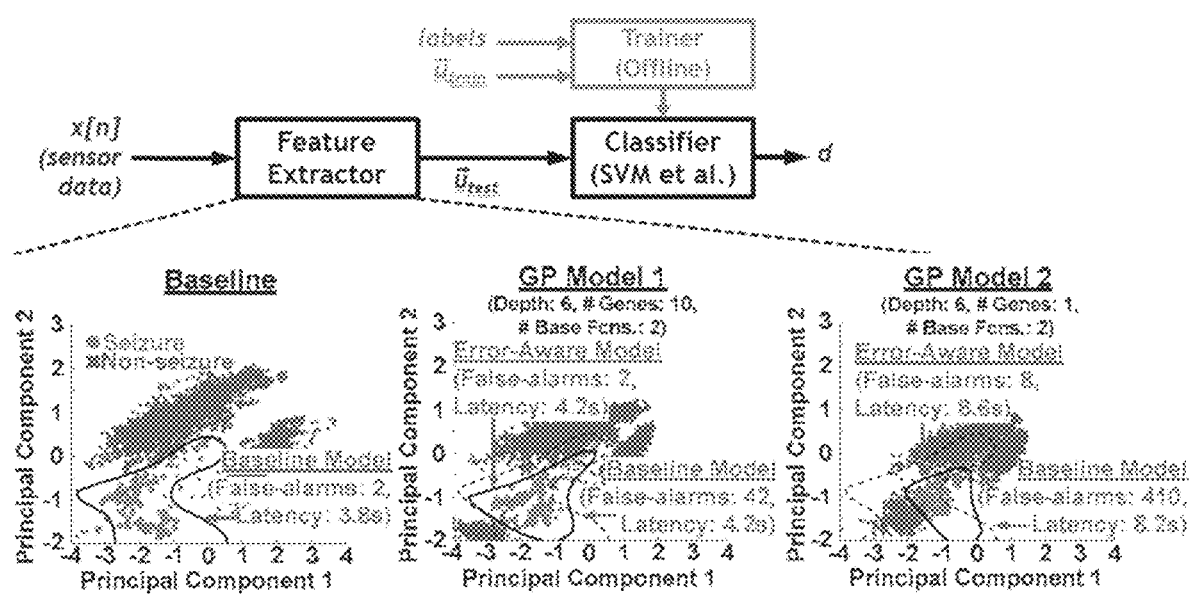
FIGS. 5A and 5B illustrate error-aware modeling for GP-model approximation, using feature data from the prototype.
Figure 5B:
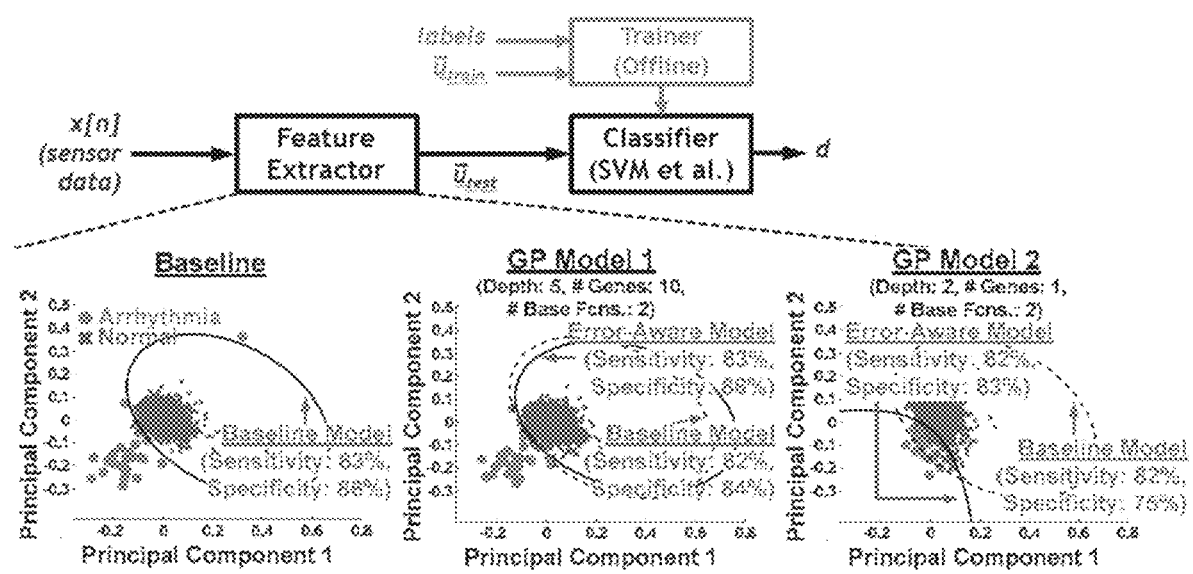

To enable approximation for greater energy efficiency, re-training of the classification model is performed. In one example, errors due to hardware faults in the feature-extraction stage are overcome by using the error-affected feature data for classifier training. The resulting model is referred to as an error-aware model. In the disclosed system, energy scalability is achieved by constraining gene depth, number, and base functions. Since this impacts fitness of computed features, an error-aware model is used to restore classification accuracy for graceful degradation. FIGS. 5A and 5B illustrate error-aware modeling for GP-model approximation, using feature data from the prototype. For two demonstrated applications (described below), the first plot shows data from hand-tuned code (baseline) on the CPU, representing exact features (for visualization, high-dimensional feature data is projected to two dimensions using PCA). The next two plots show data from GP models on the FEA, representing two approximation points (GP Model 1 and GP Model 2). FIG. 5A is directed EEG Based Seizure Detection. FIG. 5B is directed to ECG Based Arrhythmia Detection. As shown, the feature distributions are significantly altered. But, as is typical, class separability is maintained much more robustly, and the error-aware model substantially restores classification accuracy.

Figure 6:
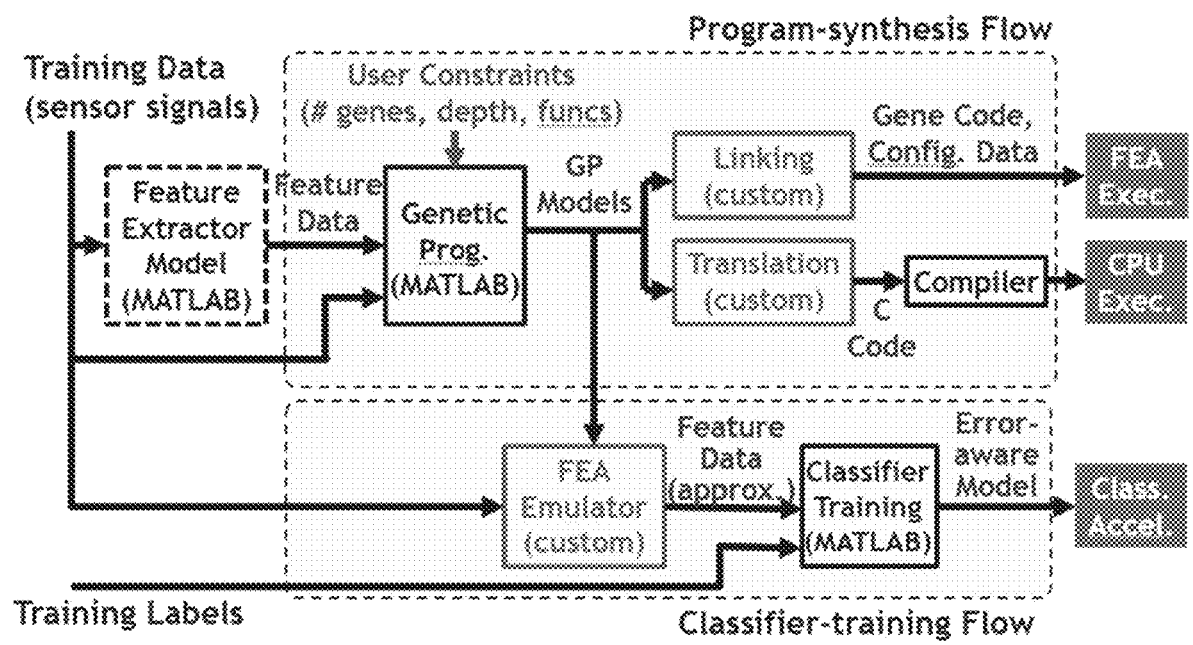
FIG. 6 shows the automatic-programming & classifier-training flow developed, taking only input-output feature data and training labels as inputs, providing gene code and classifier model as outputs.

FIG. 6 shows the automatic-programming & classifier-training flow developed, taking only input-output feature data and training labels as inputs, providing gene code and classifier model as outputs.

Figure 7A:
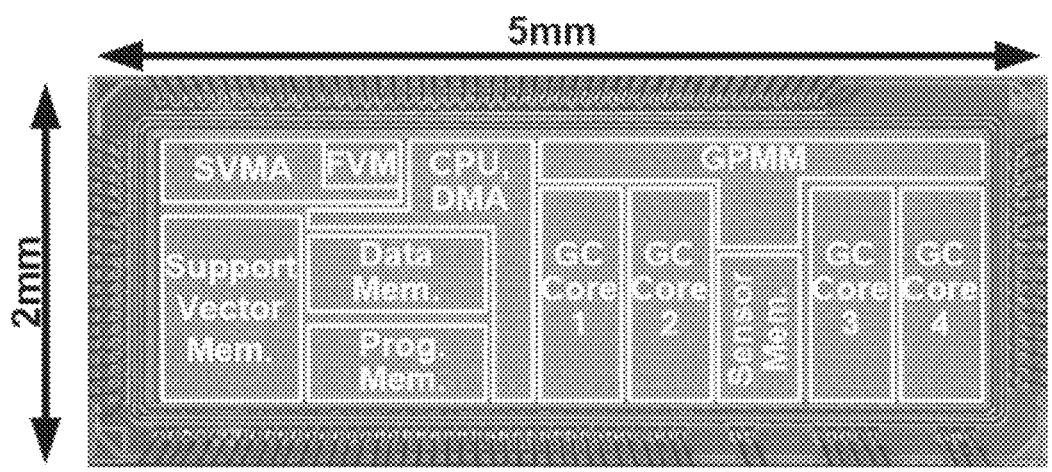
FIG. 7A shows a prototype microprocessor in 130 nm CMOS.
Figures 7B, 7C, 7D:
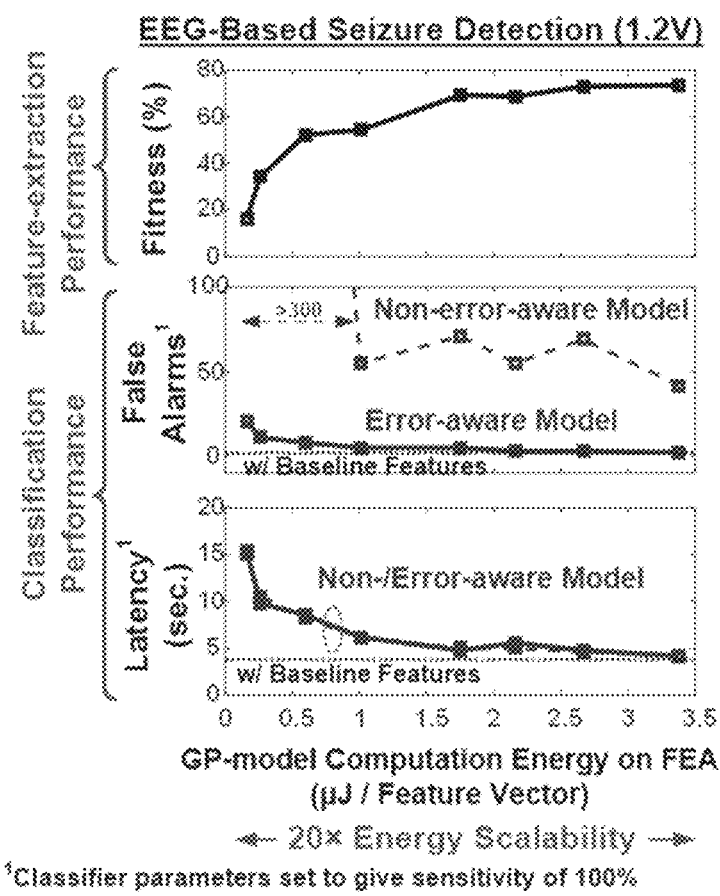
FIG. 7B shows the measured feature fitness vs. energy for EEG-based seizure detection.
FIG. 7C shows the classification accuracy vs. energy for EEG-based seizure detection.
FIG. 7D shows latency vs. energy for EEG-based seizure detection.
Figures 7E, 7F, 7G:
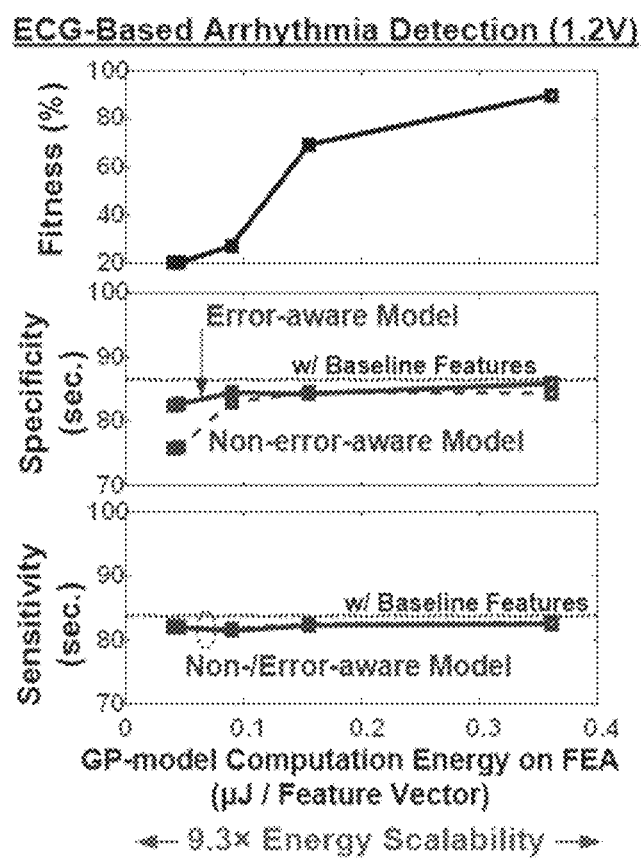
FIG. 7E shows the measured feature fitness vs. energy for ECG-based cardiac-arrhythmia detection.
FIG. 7F shows the classification accuracy vs. energy for ECG-based cardiac-arrhythmia detection.
FIG. 7G shows latency vs. energy for ECG-based cardiac-arrhythmia detection.

FIG. 7A shows a prototype microprocessor in 130 nm CMOS. Two medical-sensor apps are demonstrated: (1) EEG-based seizure detection; and (2) ECG-based cardiac-arrhythmia detection. For variously constrained GP models running on the FEA for EEG-based seizure detection, FIG. 7B shows the measured feature fitness vs. energy. FIG. 7C shows the classification accuracy vs. energy (false alarms) with/without error-aware model. FIG. 7D shows latency vs. energy. For variously constrained GP models running on the FEA for ECG-based cardiac-arrhythmia detection, FIG. 7E shows the measured feature fitness vs. energy. FIG. 7F shows the classification accuracy vs. energy (false alarms) with/without error-aware model. FIG. 7G shows latency vs. energy. While fitness degrades with energy, error-aware modeling greatly improves classification, enabling a large energy-scalability range (20× and 9.3×).

Figure 8A:
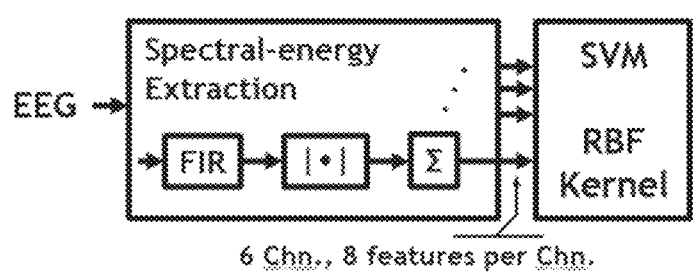
FIG. 8A is a block diagram for EEG-based seizure detection.
Figure 8B:
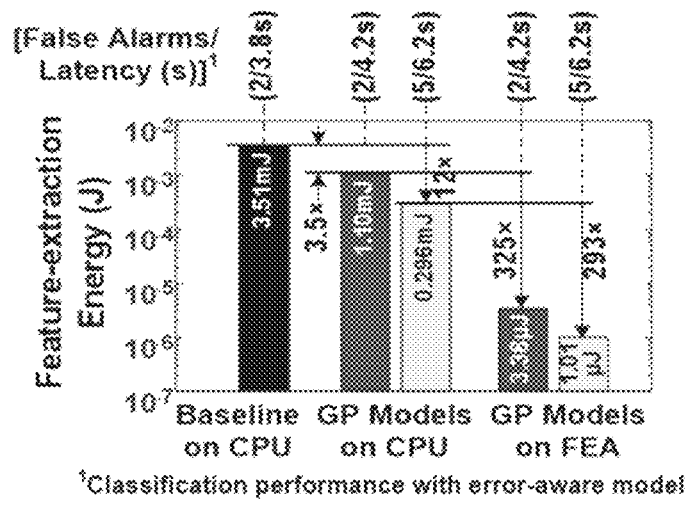
FIG. 8B is a bar plot showing feature-extraction energies for three cases: (1) baseline implementation on CPU; (2) two GP models (corresponding to FIG. 5A) running on CPU; and (3) same GP models running on FEA.
Figure 8C:
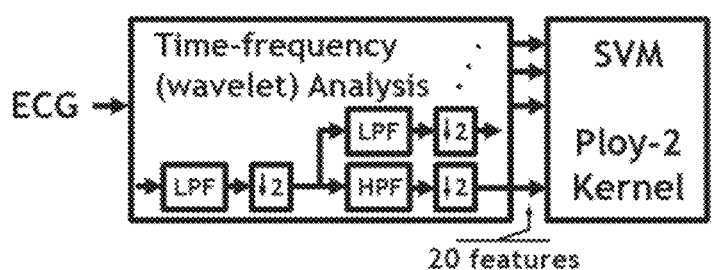
FIG. 8C is a block diagram for ECG-based cardiac-arrhythmia detection.
Figure 8D:
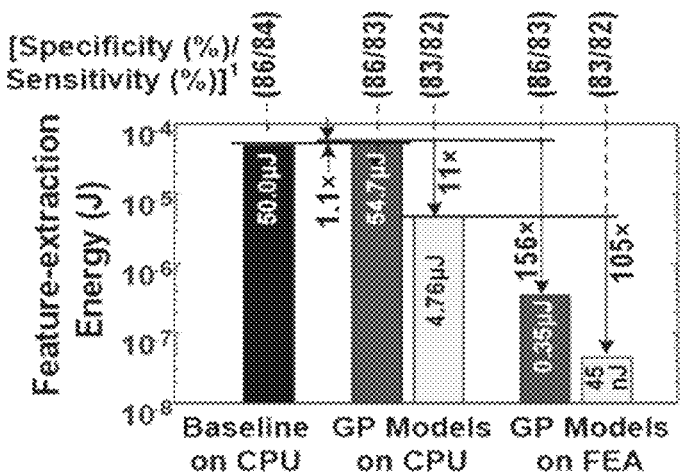
FIG. 8D is a bar plot showing feature-extraction energies for three cases: (1) baseline implementation on CPU; (2) two GP models (corresponding to FIG. 5B) running on CPU; and (3) same GP models running on FEA.
Figure 8E:
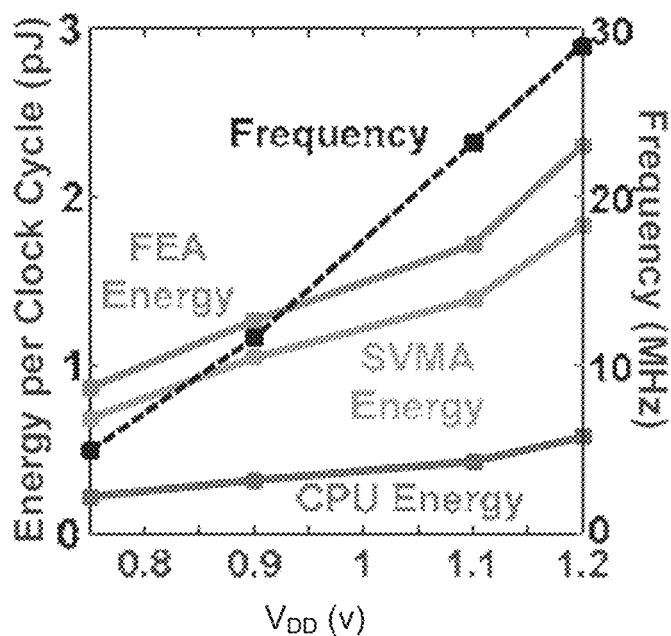
FIG. 8E is a graph showing Energy/Frequency vs. $V_{DD}$× 100.

FIGS. 8A-8G show the measurement summary for a variety of configurations. FIG. 8A the block diagram for EEG-based seizure detection. FIG. 8B is a bar plot showing feature-extraction energies for three cases: (1) baseline implementation on CPU; (2) two GP models (corresponding to FIG. 5A) running on CPU; and (3) same GP models running on FEA. FIG. 8C the block diagram for ECG-based cardiac-arrhythmia detection. FIG. 8D is a bar plot showing feature-extraction energies for three cases: (1) baseline implementation on CPU; (2) two GP models (corresponding to FIG. 5B) running on CPU; and (3) same GP models running on FEA. FIG. 8E is a graph showing Energy/Frequency vs. $V_{DD}$×100.

On the CPU, even at the high-accuracy approximation points, GP models incur roughly the same energy as baseline implementation (3.5× reduction, 1.1× increase for two apps). But, FEA reduces GP model energies by 325×/293× and 156×/105× for the two apps and approximation points. FIG. 8F is a summary table showing the block breakdown for energy/clock and energy of the apps, with programmable feature extraction now below fixed-function classification (CPU, DMA are <40 nJ/feature-vector). FIG. 8G is a comparison table showing the FEA energy scalability and efficiency (220 GOPS/W), which is close to fixed-function accelerators, exceeding programmable accelerators, especially when taking technology into consideration. While typical programmable accelerators derive energy-efficiency from vector or array processing, the FEA is enabled by high degree of specialization thanks to GP models.

Further disclosure is contained in the paper by Kyong Ho Lee and Naveen Verma entitled *A Low-Power Processor With Configurable Embedded Machine-Learning Accelerators for High-Order and Adaptive Analysis of Medical-Sensor Signals*, IEEE Journal of Solid-State Circuits, Vol. 48, No. 7, July 2013 which is incorporated herein in their entirety. It should be understood that many variations are possible based on the disclosure herein. Although features and elements are described above in particular combinations, each feature or element can be used alone without the other features and elements or in various combinations with or without other features and elements. The digital processing techniques disclosed herein may be partially implemented in a computer program, software, or firmware incorporated in a computer-readable (non-transitory) storage medium for implementation in hardware. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application-Specific Integrated Circuits (ASICs), Field-Programmable Gate Arrays (FPGAs) circuits, any other type of integrated circuit (IC), and/or a state machine.

What is claimed is:

1. A heterogeneous microprocessor configured to perform classification on an input signal, the heterogeneous microprocessor comprising:
    a die with a central processing unit (CPU) a programmable feature-extraction accelerator (FEA) and a classifier;
    wherein the FEA is configured to perform feature extraction on the input signal, via acceleration of execution of a genetic program, which approximates targeted computations in a structured manner, to generate feature data provided to the classifier, the FEA comprising a plurality of Gene-Computation (GC) cores and a genetic programing (GP) model manager (GPMM) for linear combination of outputs obtained from the GC cores;
    wherein the FEA, CPU, and classifier are physically separate from each other, wherein the FEA outputs to the feature vector buffer; and
    wherein the microprocessor utilizes an application-specific integrated circuit (ASIC) architecture.

2. The heterogeneous microprocessor of claim 1, wherein each of the GC cores comprise a controller, a gene-code memory and a single-instruction execution pipeline with an arithmetic logic unit (ALU) and a stack scratchpad.

3. The heterogeneous microprocessor of claim 2, wherein the pipeline is optimized to implement tree-structured genes.

4. The heterogeneous microprocessor of claim 1, wherein the FEA is configured for genetic programing with gene depth constraints, gene number constraints and base function constraints.

5. The heterogeneous microprocessor of claim 1, further comprising a Power Management Unit for controlling fine-grained clock gating.

6. The heterogeneous microprocessor of claim 1, wherein the classifier is a support-vector machine accelerator (SVMA).

7. The heterogeneous microprocessor of claim 6, wherein the SVMA includes training data based on error-affected feature data.

8. The heterogeneous microprocessor of claim 1, wherein the classifier is configured to perform classification on the feature data, the classifier comprising a feature vector buffer; and
    wherein the CPU is configured to provide processing after classification.

9. A method of performing classification on an input signal with a heterogeneous microprocessor, the method comprising:
    providing a die with a central processing unit (CPU) a programmable feature-extraction accelerator (FEA) and a classifier, where the FEA, CPU, and classifier are physically separate from each other, the die utilizes an application-specific integrated circuit (ASIC) architecture;
    the FEA being configured to perform feature extraction on the input signal, via acceleration of execution of a genetic program, which approximates targeted computations in a structured manner, to generate feature data provided to the classifier, the FEA comprises a plurality of Gene-Computation (GC) cores and a genetic programing (GP) model manager (GPMM) for linear combination of outputs obtained from the GC cores, and the FEA is configured to output to a feature vector buffer on the classifier;
    the classifier being configured to perform classification on the feature data;
    the CPU being configured to provide processing after classification.

10. The method of claim 9, wherein each of the GC cores comprise a controller, a gene-code memory and a single-instruction execution pipeline with an arithmetic logic unit (ALU) and a stack scratchpad.

11. The method of claim 10, wherein the pipeline is optimized to implement tree-structured genes.

12. The method of claim 9, wherein the FEA is configured for genetic programing with gene depth constraints, gene number constraints and base function constraints.

13. The method of claim 9, further comprising a Power Management Unit for controlling fine-grained clock gating.

14. The method of claim 9, wherein the classifier is a support-vector machine accelerator (SVMA).

15. The method of claim 14, wherein the SVMA includes training data based on error-affected feature data.

16. A non-transitory computer-readable medium containing instructions for performing a method of classification on an input signal with a heterogeneous microprocessor comprising a die with a central processing unit (CPU) a programmable feature-extraction accelerator (FEA) and a classifier, where the FEA, CPU, and classifier are physically separate from each other, the FEA comprises a plurality of Gene-Computation (GC) cores and a genetic programing (GP) model manager (GPMM) for linear combination of outputs obtained from the GC cores, the microprocessor utilizing an application-specific integrated circuit (ASIC) architecture, the method comprising:
    causing the FEA to perform feature extraction on the input signal, via acceleration of execution of a genetic program, which approximates targeted computations in a structured manner, to generate feature data provided to the classifier;
    causing the FEA to output to a feature vector buffer on the classifier;
    causing the classifier to perform classification on the feature data; and
    causing the CPU to provide processing after classification.

* * * * *